United States Patent [19]

Matzner et al.

[11] 4,160,396

[45] Jul. 10, 1979

[54] APPARATUS FOR THE PERFORATION OF TRACKS OF GOODS

[75] Inventors: Peter Matzner, Winnenden; Ehrhart Schulze, Fellbach, both of Fed. Rep. of Germany

[73] Assignee: Felix Stiegler Maschinenfabrik, Stuttgart, Fed. Rep. of Germany

[21] Appl. No.: 894,436

[22] Filed: Apr. 7, 1978

[30] Foreign Application Priority Data

Apr. 13, 1977 [DE] Fed. Rep. of Germany ....... 2716278

[51] Int. Cl.[2] .......................... B26D 7/18; B29C 17/10

[52] U.S. Cl. .......................................... 83/100; 83/124; 83/141

[58] Field of Search .......................... 83/141, 123-128, 83/132, 133, 136, 653, 100

[56] References Cited

U.S. PATENT DOCUMENTS

| | | | |
|---|---|---|---|
| 788,217 | 4/1905 | Mohr | 83/653 X |
| 2,595,305 | 5/1952 | Scott | 83/141 X |
| 3,550,494 | 12/1970 | Adams et al. | 83/123 X |
| 3,939,743 | 2/1976 | Coombes | 83/123 X |

*Primary Examiner*—J. M. Meister
*Attorney, Agent, or Firm*—Martin A. Farber

[57] ABSTRACT

An apparatus for the perforation of tracks of goods which are transportable approximately in their plane, particularly of thermoplastic synthetic material foils, with at least one sleeve-shaped punching tool which is moveable back and forth relative to the track of goods perpendicularly to the plane of transportation and parallel to its longitudinal axis, with a coaxially arranged pin which engages in the hollow punching tool for discarding the stamping cuttings, with a carrier of the track of goods arranged on the side of the track of goods which faces away from the pin, the carrier extending crosswise to the direction of transportation, and a carrier of the pin arranged parallel to the carrier of the track of goods and extending over its entire width. The carrier of the pin which serves as the ejector of the stamping cuttings carries the punching tool beyond the pin. The carrier is moveable, parallel to its longitudinal axis in a forward stroke with a velocity exceeding the accelerated rate of gravity, toward the stationary carrier of the track, and the ejector pin is coaxially guided in the punching tool and is freely moveably mounted limited therein with such an axial play that the ejector pin is able to push the stamp cuttings out of the punching tool.

12 Claims, 6 Drawing Figures

APPARATUS FOR THE PERFORATION OF TRACKS OF GOODS

Figures 1, 2, 3, 4, 5:
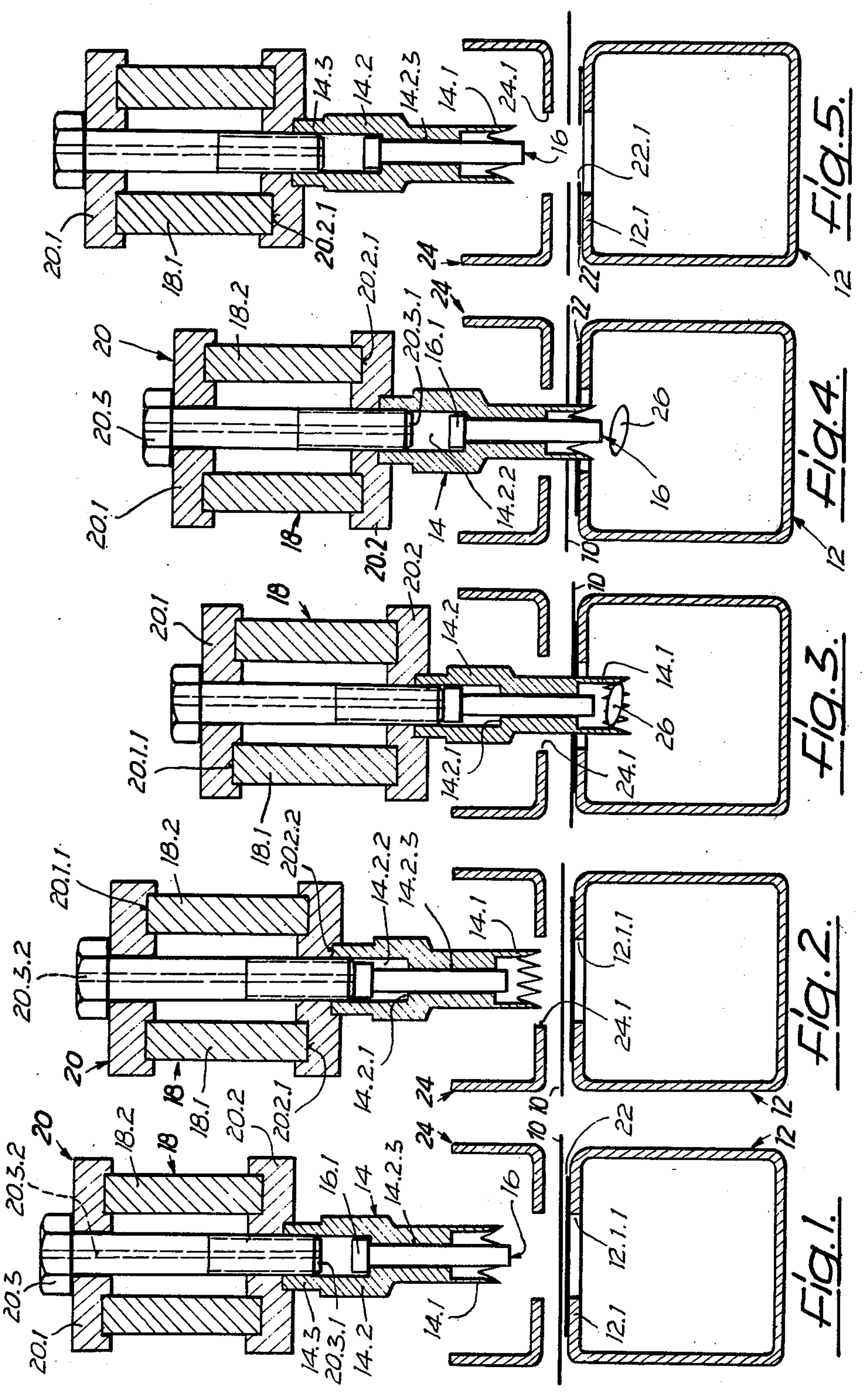

The invention relates to an apparatus for perforation of tracks of goods which are transportable approximately in their plane, particularly of thermoplastic synthetic material foils, with at least one sleeve-shaped punching tool which is moveable back and forth perpendicularly to the plane of transportation and parallel to its longitudinal axis relative to the track of goods, with a coaxially arranged pin which engages in the hollow punching tool for discarding the stamping waste or cuttings, with a carrier of the track of goods which is arranged on the side of the track of goods which faces away from the pin and which extends crosswise to the direction of transportation, and with a carrier of the pin which is arranged parallel to the carrier of the track of goods and which extends over its entire width.

With a device of this type known from German GMS No. 1,980,403 the pin which discards the stamping cuttings is releasably fastened on a certain location of its unmoveable carrier thereon, whereas the hollow punching tool is mounted axially displaceable in the carrier of the track of goods. During the perforation, the sleeve-shaped stamping tool first receives the platelet-shaped stamping cutting and carries it along until it is arrested on the front side of the stamp-like pin as long as the punching tool slides further over the pin. The danger exists that the punching tool is obstructed or clogged by the jamming or building up of the stamping cuttings and then is no longer able to punch. Moreover it is possible that with a synthetic material foil as the track of goods, the stamping cuttings remain stuck on the front side of the pin where electrostatic forces hold it, and that the stamping cuttings thereafter are carried along during the transportation of the foil track and later are disturbing.

An elastic or spring-suspended deflector sleeve which is displaceably mounted in the carrier of the track of goods on the punching tool, with the known device insures that the track of goods rises over the punching tool which is located in its lower reversing position as long as the track is transported. This lifting device requires an unnecessary expense with the production of the apparatus and causes a deformation of the track of goods, which is undesirable.

It is thus an object on which the present invention is based to provide a device in accordance with he introductory mentioned type which avoids at least the named disadvantages of the known device, with which the stamping cuttings are discarded with security in the simplest possible manner.

This object is aided in its solution in accordance with the present invention by an apparatus of the introductory mentioned type in the manner that the carrier (e.g., 18) of the pin which serves as the ejector of the stamping cuttings (26) carries the punching tool (14) apart from or beyond the pin, and parallel to its longitudinal axis in a forward stroke with a velocity exceeding the accelerated rate of fall in the gravitational field of the earth the carrier is moveable toward the stationary carrier (12) of the track (10) of goods, and that the ejector pin (16) is guided coaxially in the punching tool (14) and is freely moveably mounted, limited with such an axial play that the ejector pin can push the stamping cuttings (26) out of the punching tool.

The invention makes use of the inertia of the ejector pin which is manufactured comprising a material which is as heavy as possible, in the manner that the ejector pin, after the perforation of the track of goods, when the punching tool has reached the reversing point between the forward stroke and the rear stroke, executes an ejector movement relative to the punching tool. By this the stamping cuttings which arise by the perforation is pushed out from the cutter end of the punching tool. During the rearward stroke of the punching tool the loosely mounted ejector pin is simply carried along, so that the ejector pin again reaches its starting position without anything further at the reversing point between the rearward stroke and the forward stroke of the punching tool. Also foil platelets as stamping cuttings no longer electrostatically adhere on the ejector pin, because the mutual or reciprocal contact only lasts shortly and the pin further suddenly stops or remains stationary by means of the abrupt completion of its relative movement, so that the further moving stamping waste as a result of its inertia is removed from the pin, if it adhered thereon. A clogging of the punching tool also cannot occur for the ejector bolt does not push the stamping cutting into the stamping tool, but rather pushes it out from this. Finally the resilient or spring-suspended deflector sleeve of the known device is made unnecessary and done away with so that the track of goods for the transportation is not lifted.

With a preferred embodiment of the device in accordance with the present invention the ejector pin (16) which stands on both ends under atmospheric pressure is provided on its rear end which is arranged further remote from the cutting edge (14.1) of the punching tool (14) with a piston-formed abutment head (16.1) and the punching tool is provided with an inner shoulder (14.2.1), which shoulder carries the abutment head therealong during the return stroke of the punching tool. The abutment head of the ejector pin and the inner shoulder of the punching tool cooperate in the manner that the abutment head abuts on the inner shoulder at the end of the relative movement of the ejector pin and in this manner is prevented from a departure from the punching tool and that the inner shoulder at the beginning of the return stroke of the punching tool or during the return stroke abuts on the abutment head and the latter is thereby carried therealong.

With the preferred embodiment the carrier (18) of the unit comprising the punching tool 14 and the ejector pin (16) is provided on both of its ends respectively each with one cylinder-piston combination aggregate unit for execution of the forward stroke and rear stroke of the carrier. The two preferably pneumatically actuated aggregate units, which are provided double acting or single acting and in the latter case with a return or restoring spring, by means of a reversing gear and periodical or aperiodical control, can be accelerated so strongly that the non-slip or geared driven punching tool overtakes or outruns the lagging ejector pin during the forward stroke. The attained velocity must be the greatest if its weight acts on the ejector pin, that is when the forward and rearward strokes are vertically performed.

With the preferred embodiment the unit comprising the punching tool (14) and the ejector pin (16) is releasably fastened on its carrier (18) by means of a clamping device (20) and is continuously adjustably displaceably secured along this carrier (18). The device is consequently universally useable independently of the position of the hole in the track of goods which is to be punched.

With the preferred embodiment it is provided that the carrier (18) of the unit comprising the punching tool (14) and the ejector pin (16) has two preferably edgewise arranged parallel rails (18.1, 18.2), and the clamping device (20) has two clamping jaws (20.1, 20.2) acting on the carrier rails (18.1, 18.2) as well as a securing screw 20.3 connecting the two clamping jaws. In this manner it is possible in a particularly simple manner to displace or remove the punching tool on its carrier along at the desired position.

The preferred embodiment is characterized in the manner that the fastening screw (20.3) of the clamping device (20) is screwed with one (20.2) of the clamping jaws (20.1, 20.2) and with a securing end (14.3) of the punching tool (14), which securing end is mounted on this clamping jaw (20.2), and an axially parallel bore (20.3.2) extends therethrough for ventillating and deaerating the stroke space (14.2.2) for the abutment head 16.1 on the ejector pin (16), and that the front end (20.3.1) of the securing screw (20.3), which front end engages in the punching tool (14), carries the abutment head (16.1) along delayed or retarded during the forward stroke of the punching tool. In this manner in a simple manner three objects are achieved. Firstly a part of the clamping device, namely its screw, serves simultaneously for the fastening of the punching tool on another part of the clamping device. Secondly the air bore insures that also the rear end of the ejector bolt stands under atmospheric pressure. Thirdly the securing screw of the clamping device simultaneously forms a driver for the abutment head of the ejector pin, which securing screw contacts during the forward stroke of the punching tool until the forward movement of the punching tool is decelerated or retarded.

With the preferred embodiment the carrier of the track (10) of goods is formed as a suction tube (12) which is connected to a negative pressure source, the suction tube having a planar support surface (12.1 and 22) for the track of goods and one opening (12.1.1 and 22.1) in the support surface, which opening admits the punching tool (14). The not unconditionally necessary suction tube collects the stamping cuts which are pushed in through its opening by the ejector pin and leads them away to the negative pressure source where a separator or the like is located which collects the cuttings in a container. A possible foil platelet standing under the suction or vacuum action yet adhering on the ejector pin with the latter is surely torn off and carried away. With the device of the introductory mentioned type known from German GMS No. 1,980,403 the stamping cuttings fall through the tubular-shaped punching tool into an inclined collector channel, on the end of which there can be found a collector container. It is indeed per se known with similar devices to blow the stamping cuttings away by means of compressed air. In addition however a blowing device is required which consumes a lot of air and is provided mostly with control or distributor valves. The blowing device requires a higher manufacturing expense than the suction tube connected to a pump, the suction or vacuum efficiency of which can be comparatively small since the opening in the suction tube is open or clear only during the short time between the departure from the opening by the punching tool undergoing its return stroke and the subsequent transportation of the track of goods and the stamping cuttings then are already located in the suction tube.

The preferred embodiment as the known introductory mentioned device is provided with a plurality of pairs of punching tools and ejector pins, which with the apparatus of the invention each forms one unit. A particular feature of the preferred embodiment now results in that, in the support surface (12.1) of the suction tube (12) there is provided one slot (12.1.1) extending crosswise to the transportation direction, which slot is covered by a flat strip 22 glued onto the support surface, preferably made of paper, which strip has holes 22.1 as openings of the suction tube (12), the holes being stamped out by the punching tool (14). The punching tool thus there where they are needed. If after the loosening of the clamping device which holds a unit comprising the punching tool and the ejector pin on the carrier, the unit is shifted on the carrier, the paper strip only needs to be pulled off and to be replaced by an unperforated paper strip, which paper strip during the first perforation operation receives the suction tube opening at a new position. This is true of course for all units, independently of whether they are shifted or not.

By a device (24), present with the preferred embodiment, which device (24) is arranged spaced with respect to the support surface (12.1) of the carrier (12) of the track (10) of goods, for deflecting the track of goods from the punching tool (14) found in its reversing position remote from the track which position is reached between the return stroke and the forward stroke, and for protecting against the punching tool, the arrangement of the track of goods in the area of the apparatus may be facilitated and the safety regulations may be satisfactorily complied with.

The deflection and protection device (24) for example can be formed in profile as a U-shaped plate with a slot (24.1) for the passage therethrough of the stamping tool (14), which slot (24.1) extends parallel to the slot (12.1.1) of the suction tube (12).

With a modification of the preferred embodiment, which has an ejector pin of the same diameter, however a cutter end of the punching tool with a substantially larger inner diameter, the forward end of the ejector pin (116) which pushes the stamping cuttings from the punching tool (114) is provided with a flat disc 128, the outer diameter of which is somewhat smaller than the inner diameter of the cutting end (114.1) of the punching tool. The disc bridges over a considerable difference of the diameter and thereby provides for a positive or sure pushing of the stamping cuttings into the suction tube. For differently sized punching tools also the same ejector pin can be used and the disc forms an adapter.

Figure 6:
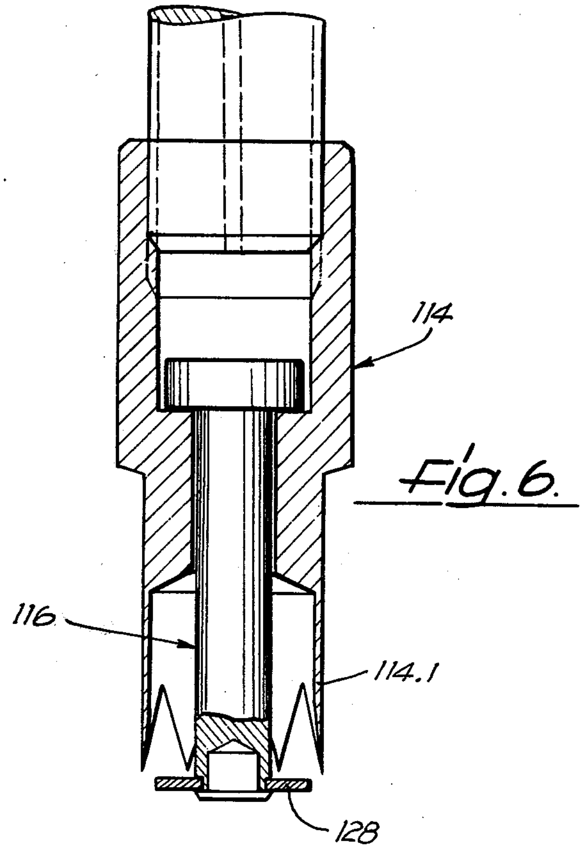

With the above and other objects and advantages in view, the present invention will become more clearly understood in connection with the following detailed description of a preferred embodiment, when considered with the accompanying drawings, of which:

FIGS. 1–5 are similar longitudinal cross-sectional views through an embodiment, respectively, at the beginning of the forward stroke, during the forward stroke, shortly before the end of the forward stroke, after the punching, during the return stroke, and at the end of the return stroke of the stamping tool in accordance with the present invention, respectively; and FIG. 6 is a longitudinal cross-sectional view through a unit comprising another embodiment of the punching tool and ejector pin.

An embodiment of the apparatus in accordance with the invention illustrated in the drawings for punching holes in thermoplastic synthetic or plastic material—foil tracks 10 comprises essentially a carrier 12 for the foil track, a plurality of units or pairs of punching tools 14 and ejector pins 16, a carrier 18 of these units, a plurality of clamping devices 20 for securing or fastening the units on the carrier 18, and two pneumatically driven cylinder-piston aggregate units (not illustrated) which simultaneously drive the carrier 18 of the units comprising the punching tool 14 and ejector pins 16 for the repeated execution of a forward stroke and return stroke of the carrier.

The carrier of the foil track 10 is a suction tube 12 which is square in cross-section, one end of which is connected to a not indicated suction or vacuum pump with a collector for the cuttings. The upper horizontal support surface 12.1 is provided with an axially-parallel slot 12.1.1 equally wide everywhere. The support surface 12.1 which carries the foil track 10 along or lengthwise of the vacuum or suction tube 12 is covered in the area of the slot 12.1.1 with a paper strip 22 which is glued or adhered onto the upper support surface 12.1. The paper strip has no holes before the beginning of the operation of the apparatus.

Above the vacuum or suction tube 12 at a spacing which facilitates the passage of the foil track 10 therethrough there is located a deflector and protection device 24 in the form of a sheet which is U-shaped in profile with a slot 24.1. The slot 24.1 extends parallel to the slot of the suction tube, so that the device 24 forms a symmetrically arranged counterpiece at the upper half of the suction tube 12.

Each of the punching tools 14 which is arranged vertically over the two slots 12.1.1 and 24.1 has three sections, namely, at the bottom a serrated edged hollow cutter end 14.1, in the middle a guide part 14.2 and at the top a securing or fastening end 14.3 which is provided with an inner thread. The outer diameter of the cutter end 14.1 is smaller than the widths of the slots 12.1.1 and 24.1. The guide part 14.2 has a bore extending therethrough with an inner shoulder 14.2.1, which separates a stroke space 14.2.2 which is open at the securing end 14.3 from a guide 14.2.3 for the ejector or knock-out pin 16. The punching tool 14 with respect to its longitudinal axis which cuts the center lines of the slots 12.1.1 and 24.1 is constructed as a rotationally symmetrically formed sleeve, which receives the ejector pin 16.

The ejector pin 16 on its rear end has a piston-shaped abutment head 16.1, which moves in the stroke space 14.2.2 without radial contact and cooperates with the inner shoulder 14.2.1; the latter serves as the counter abutment. The entire length of the ejector pin 16 is dimensioned at least as great so that its front end and the cutter end 14.1 lie flush, when the abutment head 16.1 and the inner shoulder 14.2.1 contact each other.

The carrier of the units comprising the punching tool and the ejector pin 16 comprise two edgewise arranged parallel ledges or rails 18.1 and 18.2 having rectangular cross-sections.

Each clamping device 20 comprises a plate-shaped upper clamping jaw or cheek 20.1, a likewise plate-shaped lower clamping jaw 20.2 and a securing screw 20.3 with a head acting on the clamping jaw 20.1 on its outer side. The two clamping jaws 20.1 and 20.2 are formed alike or identically and each have two rectangular grooves 20.1.1 and 20.2.1, respectively, for receiving the upper and lower edges, respectively, of the ledges 18.1 and 18.2. A securing screw 20.3, which is arranged vertically between the ledges 18.1 and 18.2, is screwed into the lower clamping jaw 20.2 as well as into the securing end 14.3 of the stamping or punching tool 14. With its front end 20.3.1 the securing screw 20.3 forms an abutment for the head 16.1 of the ejector pin 16. Moreover the securing end 14.3 engages complementarily fitting exactly in a circular recess 20.2.2 on the outer side of the lower clamping jaw 20.2. The screw connection of the ends 14.3 and 20.3.1 thus serves together for the mounting of the punching tool 14 on the clamping device 20 which is coordinated thereto and for the tightening of this clamping device against the carrier 18. An axially-parallel bore 20.3.2 which passes through the securing screw provides for an aeration or ventilation and deaeration of the stroke space 14.2.2.

The manner of operation of the described embodiment is as follows.

Starting from the condition illustrated in FIG. 1 in which the carrier 18 is stationary, the cutter end 14.1 of the punching tool is received by the device 24 and the abutment head 16.1 of the ejector pin rests on the inner shoulder 14.2.1 of the punching tool. If the carrier 18 is now moved quickly enough vertically downwardly by means of the mentioned aggregate unit, the punching tool 14 is moved therealong, whereas the ejector pin 16 as a consequence of its inertia so to say stops or remains stationary in the air and a relative upward movement is facilitated, until its head 16.1 abuts against the forward end 20.3.1 of the screw 20.3, before the foil track 10 and the paper strip 22 are yet punched as illustrated in FIG. 2. Subsequently the punching tool 14 and the ejector pin 16 are moved jointly downwardly whereby the cutting end 14.1 first perforates the foil track 10 and subsequently, almost simultaneously, perforates the paper strip 22. After the perforation, the punching tool 14 heads for its lower reversing or turning point between the forward and rearward strokes, whereby it carries along the stamping waste or cuttings 26 with its cutting end 14.1. As illustrated in FIG. 3 the forward end of the ejector pin 16 still does not touch the stamping cuttings 26. Only when the downward movement of the carrier 18 is decelerated and finally becomes stationary in the lower reversing point, then the ejector pin 16 moves freely further downwardly as a result of its inertia until it abuts with its head 16.1 on the inner shoulder 14.2.1 when the punching tool 14 completes its forward stroke or just has begun the return stroke. As a consequence of the falling of the ejector pin 16 the stamping cutting 26 is pressed from the cutter end 14.1 of the punching tool 14, and indeed when this cutting end is still disposed inside of the suction tube 12, so that the stamping cutting 26 can be sucked out, as illustrated in FIG. 4. Finally the punching tool 14 and the ejector pin 16, during the return stroke of the carrier 18, again arrive in their starting positions illustrated in FIGS. 1 and 5 in the upper reversing or turning point between the return stroke and the subsequent forward stroke. Finally the illustrated operation can be repeated as soon as the foil track 10 is moved further. With the additional perforation, the already punched paper strip 22 of course is not perforated again.

When the positions and the distances of the holes which are to be punched are to be changed, only the securing screws 20.3 of the related clamping devices 20 need be loosened, whereby the clamping devices with the respectively affixed unit comprising the punching tool 14 and the ejector pin 16 can be displaced or shifted on the carrier 18 at any arbitrary position, whereupon only the securing screws still must be tightened. It is recommended that after the displacement of the stamping tools the paper strip 22 be replaced by a new unpunched strip, so that the pump does not suck additional or secondary false air into the tube 12 by holes 22.1 that have become superfluous.

The modification of the unit comprising the punching tool 114 and the ejector pin 116 illustrated in FIG. 6, is characterized by a flat disc screwed on the front end of the pin 16, which disc 126 is disposed in a radial plane and extends radially practically or almost up to the inner side of the cutter end 114.1. Consequently the difference of the diameter of the ejector pin 116 and of the cutter 114.1 of the punching tool is bridged over, so that the stamp cutting cannot go therebetween.

While we have disclosed two embodiments of the invention it is to be understood that these embodiments are given by example only and not in a limiting sense.

We claim:

1. An apparatus for perforation of tracks of goods which are transportable substantially in their plane, particularly of thermoplastic synthetic material foils, comprising at least one sleeve-shaped hollow punching tool adapted to be moved back and forth relative to the track of goods perpendicularly to the plane of transportation and parallel to its longitudinal axis, an ejector pin coaxially disposed and engaged in said hollow punching tool and adapted to discard stamping cuttings, a stationary first carrier means for carrying the track of goods, said first carrier means being arranged on a side of the track of goods which faces away from said ejector pin, said first carrier means extending transversely to the direction of transportation thereof, a second carrier means for operatively carrying said ejector pin, said second carrier means being disposed parallel to said first carrier means and extending over the entire width of the latter, said second carrier means carries said punching tool apart from said ejector pin, said second carrier means for being moved parallel to its longitudinal axis in a forward stroke with a velocity exceeding the accelerated rate of fall in the gravitational field of the earth toward said stationary first carrier means of the track of goods, and said ejector pin being guided coaxially in said punching tool and freely moveably mounted therein limited with such an axial play that said ejector pin can push the stamping cuttings out from said punching tool.

2. The apparatus as set forth in claim 1, wherein said punching tool is formed with a cutting end and an inner shoulder means, said ejector pin has two ends standing under atmospheric pressure, one of said ends constitutes a rear end arranged further remote from said cutting end of said punching tool, said rear end constitutes a piston-shaped abutment head, and said shoulder means abuts and carries said abutment head therealong during a return stroke of said punching tool.

3. The apparatus as set forth in claim 1, wherein said punching tool and said ejector pin constitute a unit, said second carrier means is for carrying said unit and has two ends, one cylinder-piston combination means on each of said ends of said second carrier means, respectively, for performing a forward stroke and return stroke of said second carrier means.

4. The apparatus as set forth in claim 1, wherein said punching tool and said ejector pin constitute a unit, clamping means for releaseably securing said unit on said second carrier means, said unit is continuously adjustably displaceably secured along said second carrier means.

5. The apparatus as set forth in claim 4, wherein said second carrier means has two preferably edgewise disposed parallel rails, said clamping means has two clamping jaws acting abuttingly on said carrier rails and a securing screw, the latter connects said two clamping jaws.

6. The apparatus as set forth in claim 5, wherein said punching tool is formed with a cutting end and an inner shoulder means, said ejector pin has two ends standing under atmospheric pressure, one of said ends constitutes a rear end arranged further remote from said cutting end of said punching tool, said rear end constitutes a piston-shaped abutment head, said shoulder means abuts and carries said abutment head therealong during a return stroke of said punching tool, said hollow punching tool has a securing end remote from said cutting end and is formed with a stroke space defined partially by said shoulder means, said securing screw is screwed to one of said clamping jaws and to said securing end of said punching tool, said securing end is mounted on said one clamping jaw, said securing screw is formed with an axially parallel bore means extending therethrough communicating with said stroke space for ventillating and deaerating the stroke space of said punching tool, said abutment head of the ejector pin is freely moveably disposed in said stroke space, said securing screw has a front end engaging in said punching tool, said front end operatively abuts and carries said abutment head therealong delayed relative to and during a forward stroke of said punching tool.

7. The apparatus as set forth in claim 1, wherein said first carrier means of the track of goods is formed as a suction tube connected to a negative pressure source, said suction tube has a planar support surface for the track of goods and is formed with one opening in said support surface, said one opening is disposed in an operative range of said punching tool and adapted to admit said punching tool.

8. The apparatus as set forth in claim 7, further comprising a plurality of pairs of said punching tools and said ejector pins, each of said pairs constitutes one unit, said support surface of said suction tube is formed with a slot extending transversely to the direction of transportation, a flat strip glued onto said support surface covering said slot, said strip is adapted to have holes stamped out by said punching tool constituting openings communicating with said suction tube.

9. The apparatus as set forth in claim 8, wherein said strip is made of paper.

10. The appartus as set forth in claim 1, further comprising means for deflection the track of goods from said punching tool found remote from the track of goods in a reversing position of said punching tool reached between a return stroke and a forward stroke of said punching tool and for protection against said punching tool, said deflection and protection means is arranged spaced from a support surface of said first carrier means for the track of goods.

11. The apparatus as set forth in claim 10, wherein said first carrier means of the track of goods is formed as a suction tube connected to a negative pressure source, said suction tube has a planar support surface for the track of goods and is formed with one opening in said support surface, said one opening is disposed in an operative range of said punching tool and adapted to admit said punching tool, said planar support surface constitutes said support surface of said first carrier means, said deflection and protection means is formed in profile as a U-shaped plate with one slot disposed in the operative range of said punching tool and adapted to admit said punching tool operatively passing therethrough, said slot extends parallel to said one opening of said suction tube.

12. The apparatus as set forth in claim 1, wherein said punching tool has a cutting end, said ejector pin has a front end adjacent said cutting end and adapted to push the stamping cuttings from said punching tool, a flat disc mounted on said front end of said ejector pin, said disc has an outer diameter somewhat smaller than the inner diameter of said cutting end of said punching tool.

* * * * *